US012783601B2

(12) United States Patent
Yamada et al.

(10) Patent No.: US 12,783,601 B2
(45) Date of Patent: Nov. 3, 2026

(54) COMPUTING DEVICE FOR ISING MODEL

(71) Applicant: NTT, Inc., Tokyo (JP)

(72) Inventors: Yasuhiro Yamada, Musashino (JP); Hiroki Takesue, Musashino (JP); Takahiro Inagaki, Musashino (JP); Toshimori Honjo, Musashino (JP); Kensuke Inaba, Musashino (JP); Takuya Ikuta, Musashino (JP); Yuya Yonezu, Musashino (JP)

(73) Assignee: NTT, Inc., Tokyo (JP)

( * ) Notice: Subject to any disclaimer, the term of this patent is extended or adjusted under 35 U.S.C. 154(b) by 216 days.

(21) Appl. No.: 18/840,787

(22) PCT Filed: Feb. 28, 2022

(86) PCT No.: PCT/JP2022/008378
§ 371 (c)(1),
(2) Date: Aug. 22, 2024

(87) PCT Pub. No.: WO2023/162254
PCT Pub. Date: Aug. 31, 2023

(65) Prior Publication Data
US 2025/0165558 A1 May 22, 2025

(51) Int. Cl.
*G06F 17/18* (2006.01)
*G06E 1/00* (2006.01)
*G06F 17/16* (2006.01)

(52) U.S. Cl.
CPC ............... *G06F 17/18* (2013.01); *G06E 1/00* (2013.01); *G06F 17/16* (2013.01)

(58) Field of Classification Search
CPC . G06F 17/18; G06F 17/16; G06E 1/00; G06E 3/00; G06N 5/01; G06N 7/01; G06N 10/00; G02F 3/00
USPC .......................................................... 359/107
See application file for complete search history.

(56) References Cited

U.S. PATENT DOCUMENTS

| | | | | |
|---|---|---|---|---|
| 11,276,009 B2 * | 3/2022 | Franzke | .................... | G06N 7/01 |
| 2018/0246393 A1 * | 8/2018 | Inagaki | ...................... | G02F 3/00 |
| 2020/0090071 A1 * | 3/2020 | Franzke | .................. | G06F 17/18 |
| 2020/0210876 A1 * | 7/2020 | Rolfe | ......................... | G06T 1/20 |
| 2020/0279062 A1 * | 9/2020 | Inaba | ...................... | G06E 3/005 |
| 2020/0393798 A1 * | 12/2020 | Kushibe | ................... | G06N 5/01 |
| 2021/0182356 A1 * | 6/2021 | Sakai | ....................... | G06F 17/11 |
| 2021/0192108 A1 * | 6/2021 | Nambu | ................... | G06F 30/20 |

(Continued)

FOREIGN PATENT DOCUMENTS

JP 2021-168096 10/2021

OTHER PUBLICATIONS

Krasnytska, M.; Berche, B.; Holovatch, Y.; Kenna, R. Generalized Ising Model on a Scale-Free Network: An Interplay of Power Laws. Entropy 2021, 23, 1175. https://doi.org/ 10.3390/e23091175 (Year: 2021).*

(Continued)

*Primary Examiner* — William R Alexander
(74) *Attorney, Agent, or Firm* — Workman Nydegger

(57) ABSTRACT

A computing device of the present invention is a computing device for an Ising model, including a means for generating a spin state for which a distribution indicating a probability of existence of the spin state for each energy of the spin state is available to be approximated by a power law distribution.

6 Claims, 4 Drawing Sheets

(56) References Cited

U.S. PATENT DOCUMENTS

| | | | | |
|---|---|---|---|---|
| 2021/0303915 | A1* | 9/2021 | Mandal | G06F 18/2321 |
| 2021/0319154 | A1 | 10/2021 | Dote et al. | |
| 2024/0394328 | A1* | 11/2024 | Takesue | G06F 17/11 |
| 2025/0390780 | A1* | 12/2025 | Lukin | G06N 10/40 |

OTHER PUBLICATIONS

Constantino Tsallis, *Nonadditive Entropy and Nonextensive Statistical Mechanics—An Overview After 20 Years*, Brazilian Journal of Physics, vol. 39, No. 2A, (2009), pp. 337-356.

I. Fukuda and H. Nakamura, *Tsallis Dynamics Using the Nosé-Hoover Approach*, Physical Review E 65, (2002), pp. 026105-1-026105-5.

T. Inagaki, et. al., *A Coherent Ising Machine for 2000-Node Optimization Problems*, Science, 354, (2016), pp. 603-606.

A. M. Chebotarev and A. E. Teretenkov, *Singular Value Decomposition for the Takagi Factorization of Symmetric Matrices*, Applied Mathematics and Computation 234, (2014), pp. 380-384.

* cited by examiner

COMPUTING DEVICE FOR ISING MODEL

TECHNICAL FIELD

The present invention relates to a computing device for an Ising model, and more particularly, to a probabilistic distribution of spin states of an Ising model generated in a computing device.

BACKGROUND ART

The Ising model is a numerical model in which a large number (N) of spins represented by a discrete variable σ having a binary value of (−1, 1) are coupled on a network, and a specific spin state $\sigma=(\sigma_1, \ldots, \sigma_N)^T$ including N spins and an energy E(σ) of the state can be associated as in the following Formula (1).

[Math. 1]

$$E(\sigma) = -\sum_{ij} J_{ij}\sigma_i\sigma_j \tag{1}$$

Here, J is a spin adjacency matrix of N rows and N columns, and each element of the matrix represents a coupling constant between spins on the network or an interaction between spins. The Ising model was originally considered in physics as a model representing thermodynamic characteristics of a ferromagnet. Then, with the development of electronic computers, the application range has been expanded, such as being used to express a model representing a discrete optimization problem or a learning model in statistical machine learning due to the simplicity and ability to increase the scope of the model.

Here, as thermodynamic characteristics, it is known that the properties of the Ising model in a thermal equilibrium state can be approximated by assuming that a microscopic spin state stochastically exists in a canonical distribution as expressed by the following Formula (2).

[Math. 2]

$$P_{Canonical}(\sigma) = \frac{\exp(-\beta E(\sigma))}{Z} \tag{2}$$

Here, β is the reciprocal (inverse temperature) of an absolute temperature when the Boltzmann constant in the thermal equilibrium system is 1, and Z is $$Z \text{ s.t. } \sum_{\sigma_1=1,-1} \cdots \sum_{\sigma_N=1,-1} P_{Canonical}(\sigma) = 1$$

which is a real number value determined from normalization of a probability. In a case where thermodynamic properties of ferromagnets are simulated, a spin state of the Ising model having this canonical distribution is sampled. The canonical distribution is a kind of exponential distribution family, and negative energy is used for an argument of an exponential function. Accordingly, it is assumed that a spin state having low energy appears at an exponentially high probability.

On the other hand, in a non-equilibrium state out of the thermal equilibrium state, a distribution that may typically occur in different systems is known. This is, for example, a power law distribution which is characterized by a q-exponential function using an Ising energy as an argument in Tsallis statistics (hereinafter, also referred to as Tsallis distribution) (refer to Non Patent Literature 1). In the case of the Ising model having the Tsallis distribution, the probability distribution of the spin state is given by the following Formula (3).

[Math. 3]

$$P_{Tsallis}(\sigma) = \frac{\exp_q(-\beta_q E(\sigma))}{Z_q} \tag{3}$$

Here, $\exp_q(x) \equiv [1+(1-q)x]^{1/(1-q)}$ is a q-exponential function obtained by extending a normal exponential function with a real number parameter q, and $Z_q$ is $$Z_q \text{ s.t. } \sum_{\sigma_1=1,-1} \cdots \sum_{\sigma_N=1,-1} P_{Tsallis}(\sigma) = 1$$

which is a real number value determined from normalization of a probability. The q-exponential function matches a normal exponential function at a limit of q=1, and thus a Tsallis distribution becomes a canonical distribution at the limit of q=1. However, in the case of q>1, the q-exponential function is subjected to gradual power law decay when the factor takes a large value, and the Tsallis distribution becomes a power law distribution in which a high energy state may also occur with some probability. The q-exponential distribution family in which q≠1 is widely observed in different systems such as earthquakes or non-equilibrium cooled atomic systems (refer to Non Patent Literature 1). Further, it is also indicated that the property of gradual power low decay with respect to energy is useful in sampling of a state in the field of molecular dynamics (refer to Non Patent Literature 2).

CITATION LIST

Non Patent Literature

Non Patent Literature 1: Constantino Tsallis, "Nonadditive entropy and nonextensive statistical mechanics—An overview after 20 years", Brazilian Journal of Physics 39, 337 (2009).

Non Patent Literature 2: I. Fukuda and H. Nakamura, "Tsallis dynamics using the Nose-Hoover approach", Physical Review E 65, 026105 (2002).

Non Patent Literature 3: T. Inagaki, Y. Haribara, et. al., "A coherent Ising machine for 2000-node optimization problems", Science 354, 603-606 (2016).

Non Patent Literature 4: A. M. Chebotarev and A. E. Teretenkov, "Singular value decomposition for the Takagi factorization of symmetric matrices", Applied Mathematics and Computation 234, 380-384 (2014).

SUMMARY OF INVENTION

As described above, a power law distribution such as a Tsallis distribution has a property of gradual decay with respect to energy, which is useful for sampling a spin state. Therefore, if an Ising model having such a power law distribution can be realized by a computing device, there is a possibility that it will be useful for sampling of a spin state in an application range such as machine learning.

An object of the present invention is to provide a computing device that generates a spin state of an Ising model according to a distribution that can be approximated by a power law distribution and samples the spin state.

In order to achieve such an object, a computing device of one aspect of the present invention includes a means for generating a spin state for which a distribution indicating a probability of existence of the spin state for each energy of the spin state is available to be approximated by a power law distribution.

DESCRIPTION OF EMBODIMENTS

Hereinafter, embodiments of the present invention will be described in detail with reference to the drawings.

Embodiments of the present invention relate to a coherent Ising machine. Specifically, as a computing device that generates a spin state of an Ising model having a Tsallis distribution, an embodiment (embodiment 1) in which a Tsallis distribution is generated by adjusting pump light in a non-oscillation region in the vicinity of an oscillation point in an actual coherent Ising machine and an embodiment (embodiment 2) in which the Tsallis distribution is generated by simulating an operation of the actual machine on an electronic computer will be described.

Embodiment 1

Figure 1:
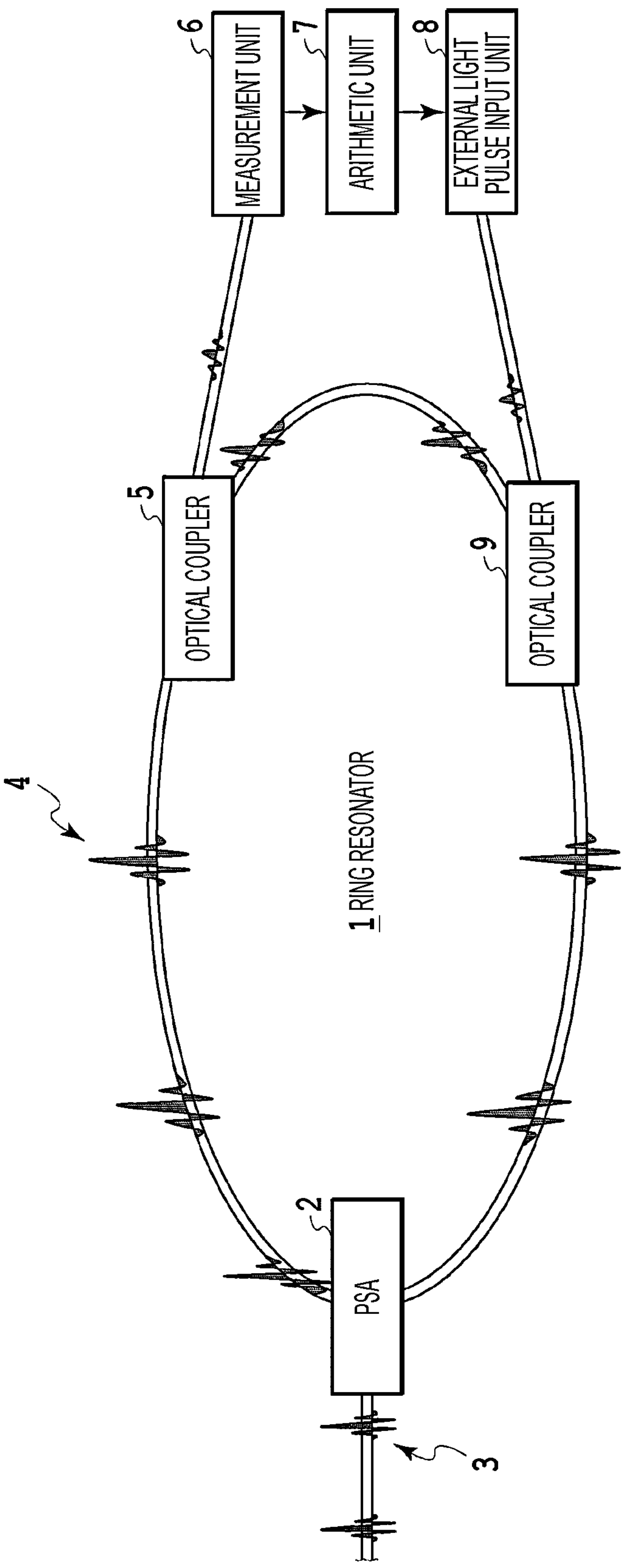
FIG. 1 is a diagram illustrating a configuration of a coherent Ising machine according to an embodiment of the present invention.

FIG. 1 is a diagram schematically illustrating a configuration of a coherent Ising machine according to a first embodiment of the present invention, and illustrates an example of a physical system simulating an electron spin degree of freedom of a ferromagnet as an Ising model. The coherent Ising machine is a device that simulates a binary degree of freedom of an Ising spin using a parametric oscillation phenomenon (a degenerate optical parametric oscillator (DOPO)) of light and implements inter-spin coupling (interaction between spins) of an Ising model by a light measurement/feedback mechanism (Non Patent Literature 3).

In FIG. 1, the coherent Ising machine injects pump light 3 into a phase sensitive amplifier (PSA) 2 provided in a ring-shaped optical fiber serving as a ring resonator 1 to generate a light pulse train 4 with a number of light pulses corresponding to the number of sites (number of spins) of the Ising model. When each light pulse of the light pulse train generated in the ring resonator 1 reaches the PSA 2 again after one round, the pump light 3 is input to the PSA 2 again to amplify each light pulse of the light pulse train 4. The light pulses of the light pulse train 4 generated by the first injection of the pump light are weak pulses whose phase is not fixed, and are amplified by the PSA 2 every time they circulate in the ring resonator 1. As a result, the phase state of each light pulse of the light pulse train 4 is gradually determined. In this case, since the PSA 2 amplifies each light pulse with a phase of 0 or π with respect to the phase of the pump light source, the phase is determined to be in any one of such phase states. At this time, when the intensity of the pump light 3 is sufficiently higher than an oscillation threshold called an oscillation point, the number of photons in each light pulse significantly increases, and the coherent light pulse train 4 with a phase of 0 or π oscillates. As described above, in the coherent Ising machine, 1 and −1 of the spins in the Ising model are implemented to correspond to the phases 0 and π of the light pulse.

As described above, an interaction (coupling constant) between pulses (that is, between spins) is given to the light pulses circulating in the ring resonator 1 by performing measurement and feedback. That is, an optical coupler 5 extracts a part of each light pulse for each circulation of the light pulses. Then, a measurement unit 6 measures a signed amplitude $x_j$ of a light pulse in the phase 0 or π direction. The sign is positive in the phase 0 direction and negative in the phase π direction. An arithmetic unit 7 is given in advance information of a coupling constant between adjacency matrices, and calculates a coupling signal to be fed back and input by using a measurement result of the measurement unit 6. A coupling signal $\Delta x_j$ fed back to the i-th light pulse is expressed by the following Formula (4).

[Math. 4]

$$\Delta x_i = \xi \sum_j J_{ij} x_j \tag{4}$$

Here, ξ is a dimensionless feedback intensity. Next, an external light pulse input unit 8 generates an external light pulse according to the calculated coupling signal $\Delta x_j$, and inputs the external light pulse into the ring resonator 1 via the optical coupler 9. By measurement/feedback control described above, it is possible to give a mutual relationship to phases between light pulses constituting a light pulse train. The light pulse train is circularly amplified in the ring resonator 1 while this correlation is given, and the phases 0 and π of the light pulses constituting the light pulse train are measured when a stable state, that is, a steady state in which a state change of the light pulses is substantially eliminated is obtained by advancing time evolution. This final measurement result is sent to an electronic computer (not illustrated) and used for a desired purpose.

In the conventional coherent Ising machine, measurement is performed with the amplitude of the pump light 3 larger than an oscillation point, that is, the oscillation threshold value (amplitude) at the time of measuring a phase in a stable state (Non Patent Literature 3).

On the other hand, in the embodiment of the present invention, the amplitude of the pump light 3 is maintained at the oscillation point or less, and measurement is performed in a state where the value is maintained. As a result, the influence of the quantum fluctuation can be increased, and the spin state of the Ising model according to the power law distribution that can be approximated by the Tsallis distribution can be sampled. An exponent γ=1/(q−1) representing a decay of probability at high energy varies with pump light intensity. As the pump light intensity approaches the oscillation point from zero, it monotonically increases from $\gamma=0$ to $\gamma=\gamma_0>0$. The value of the maximum value $\gamma_0$ of the exponent depends on a given coupling coefficient matrix. Therefore, it is possible to generate a power law distribution in which the exponent has been changed relatively freely by changing the pump light intensity. Here, the distribution is a power law distribution indicating the probability that the spin state (+1 or −1, 0 or $\pi$ in the present embodiment) exists for each energy of the spin state, and in the present embodiment, this distribution is a power law distribution that can be approximated by the Tsallis distribution.

Specifically, first, in the present embodiment, the phase of a light pulse is set to 0 or $\pi$ and the phase 0 or $\pi$ is measured in a state where the amplitude of the pump light 3 is set to a value equal to or less than the oscillation point. This is because even if the amplitude of the pump light is equal to or less than the oscillation point, when the pump light amplitude is close to the vicinity of the oscillation point, fluctuation grows in a specific direction of 0 or $\pi$, and the amplitude of the pulse is subject to strong quantum fluctuation distorted in this specific direction, and the probability that the phase takes a value in the direction of 0 or $\pi$ increases. After oscillation, the quantum mechanical fluctuation effect is weakened, and the phase of 0 or $\pi$ is determined. Further, also in measurement of the phase, as described above, the amplitude projected in the direction of 0 or $\pi$ is measured and only information in the direction of 0 or $\pi$ is acquired. As a result, phase information obtained by the measurement becomes a reduced binary value of 0 or n.

Next, in the present embodiment, a phase state (spin state) of light pulses in the power law distribution represented by the Tsallis distribution is generated in a state where the amplitude of the pump light is set to a value equal to or less than the oscillation point. This distribution generation was found by the inventors of the present application in numerical experiments using numerical computation. As a result, it is possible to sample the phase state of each light pulse in the phase state of the power law distribution.

As described above, the present embodiment realizes a computing device of an Ising model with a power law distribution (Tsallis distribution). As a result, the property of gradual power low decay with respect to energy may be useful in sampling of a spin state in an application range such as machine learning. This is because the power law distribution approximates an actual existing distribution such as in a physical phenomenon, an economic phenomenon, a social phenomenon. The canonical distribution used in the conventional Ising model computing devices is a kind of distribution called an exponential distribution family, and distinguishes the appearance probability of each spin state by an exponential function of energy. That is, it is a distribution in which a low energy state likely to occur is distinguishable from a high energy state less likely to occur and negligible. On the other hand, in the power law distribution, the appearance probability of a spin state decreases relatively slowly rather than exponentially as the energy state increases. Therefore, the appearance probability cannot be distinguished so clearly. It is known that such a power law distribution is a distribution that is often seen in an actual physical phenomenon or the like. The present embodiment can be used for applications such as machine learning by generating this power law distribution in the Ising model.

Modified Example 1 of Embodiment 1

Figure 2:
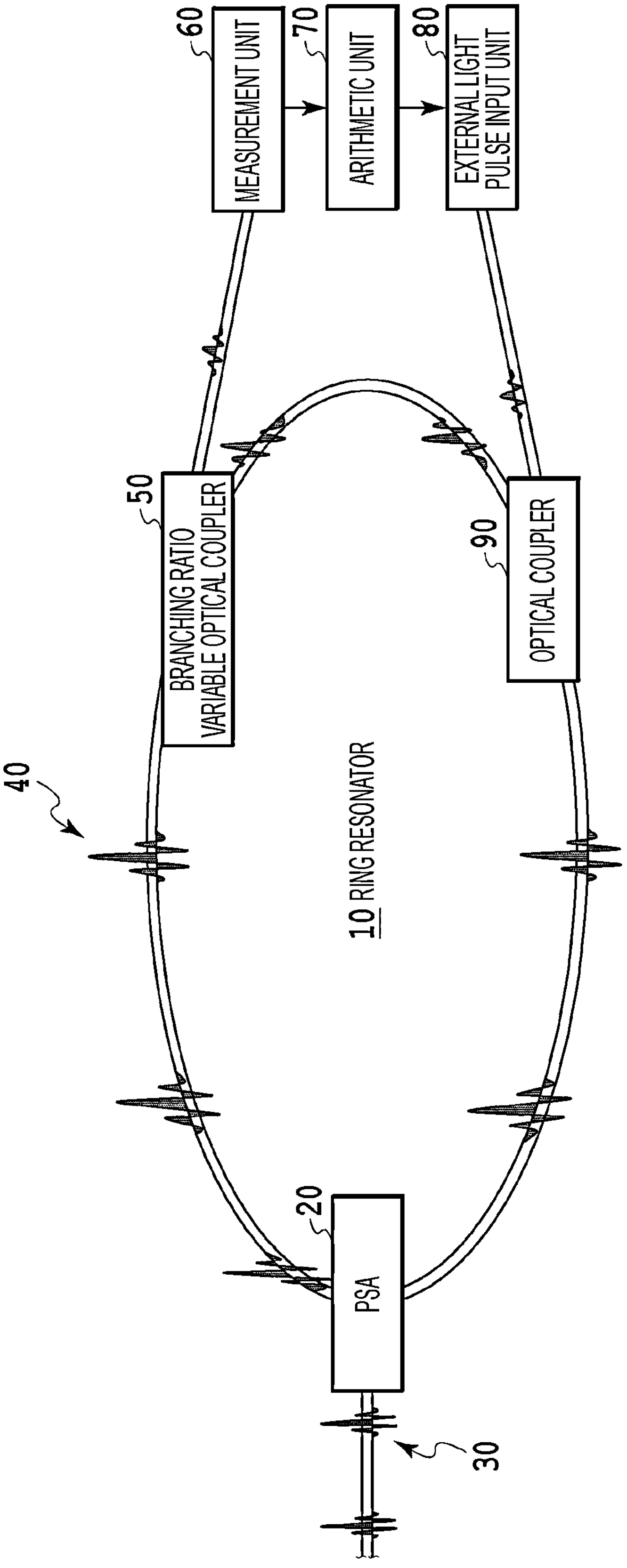
FIG. 2 is a diagram illustrating a coherent Ising machine including a branching ratio variable optical coupler in addition to the configuration illustrated in FIG. 1 according to another embodiment of the present invention.

FIG. 2 is a diagram illustrating a coherent Ising machine having a branching ratio variable optical coupler in addition to the configuration illustrated in FIG. 1 according to another embodiment of the present invention. According to this computing device, the measurement accuracy of a light pulse phase can be further improved.

The configuration illustrated in FIG. 2 is obtained by replacing the optical coupler 5 in FIG. 1 with a branching ratio variable optical coupler 50. The branching ratio variable optical coupler 50 is a coupler whose branching ratio can be temporally changed. In the configuration of FIG. 1, a part (about 10%) of photons constituting each light pulse is extracted in the optical coupler 5 and sent to the measurement unit 6. However, as described above, the Tsallis distribution is obtained in a case in which the pump light intensity is fixed to the oscillation point or a value slightly weaker than the oscillation point in the coherent Ising machine, that is, in a pump region where each light pulse does not sufficiently oscillate. In such a non-oscillation region, information obtained even when only some photons are extracted is limited, and it is difficult to completely know the spin state. Further, when the measurement branching ratio is changed from the beginning and photons of 100% are sent to the measurement unit 6, a desirable correlation (mutual relationship) between light pulses cannot be sufficiently developed.

Therefore, by using the branching ratio variable optical coupler 50, the branching ratio is maintained at a low value during a normal operation, the branching ratio is changed when the distribution is measured, and, for example, all photons (100%) are sent to the measurement unit. Note that the response time of the branching ratio variable optical coupler 50 needs to be sufficiently shorter than the time required for one round of each light pulse. By using such a branching ratio variable optical coupler, it is possible to more accurately measure a phase state (spin state) of a light pulse.

Modified Example 2 of Embodiment 1

Figure 3:
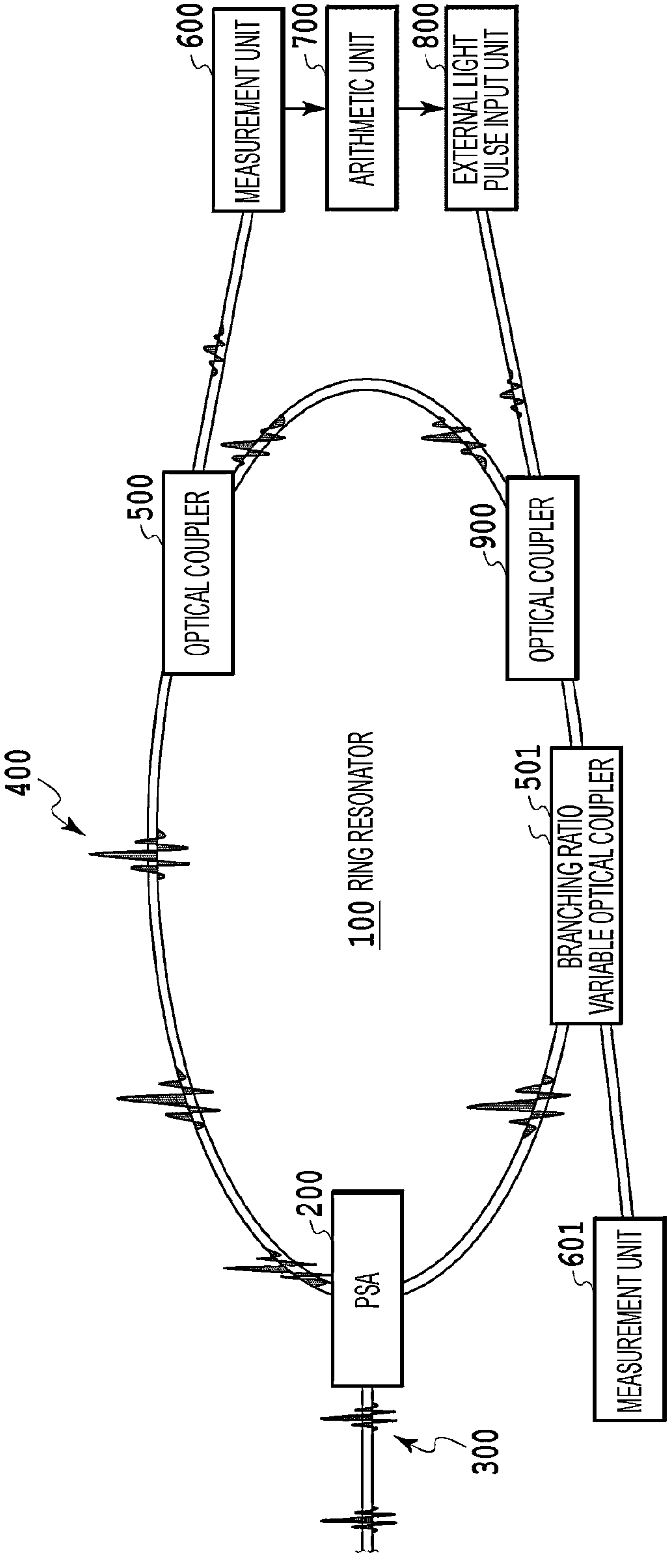
FIG. 3 is a diagram illustrating a coherent Ising machine including a branching ratio variable optical coupler and a plurality of measurement units in addition to the configuration illustrated in FIG. 1 according to still another embodiment of the present invention.

FIG. 3 is a diagram illustrating a coherent Ising machine including a branching ratio variable optical coupler and a plurality of measurement units in addition to the configuration illustrated in FIG. 1 according to still another embodiment of the present invention. This computing device can also improve the measurement accuracy of a light pulse phase.

The configuration illustrated in FIG. 3 is a configuration in which a branching ratio variable optical coupler 501 and a measurement unit 601 are newly added to the configuration illustrated in FIG. 1. The branching ratio of the branching ratio variable optical coupler 501 is set such that optical pulse train 400 is never sent to the measurement unit 601 during a normal operation, and all the optical pulse train 400 is sent to the measurement unit 601 only during measurement in a stable state. In this embodiment, the extra measurement unit 601 is required as compared with the example illustrated in FIG. 2. However, different measurement units can be used for measurement used for measurement feedback coupling and measurement in a stable state, which have essentially different roles, and optimization of experimental device parameters such as a frequency band or a response time in each measurement becomes easier.

In the embodiment described above, it is necessary to accurately know an oscillation point in order to fix the pump light amplitude to the oscillation point or a value slightly less than the oscillation point. On the other hand, this value of the oscillation point changes by changing an adjacency matrix of the Ising model. Therefore, it is possible to experimentally search for the oscillation point by gradually changing the pump light intensity every time the adjacency matrix is changed, but it is also possible to input a predetermined value in advance to the diagonal term (self-feedback term, which is usually zero) of the adjacency matrix such that the oscillation point does not change. Specifically, the value of the oscillation point can be fixed by correcting the values of all diagonal terms in advance as expressed by the following Formula (5).

[Math. 5]

$$J_{ii} \rightarrow J_{ii} - \lambda_0 \tag{5}$$

Here, $\lambda_0$ is the maximum eigenvalue of the original adjacency matrix J.

Embodiment 2

In another embodiment of the present invention, a distribution of phases (spin states) of the light pulses can also be computed by simulating the coherent Ising machine described in embodiment 1 and the modified example thereof described above on an electronic computer. A specific stochastic differential equation implemented on the electronic computer is given by the following Formula (6).

[Math. 6]

$$dQ = f(Q)\,d\tau + \sqrt{2}\,\sigma_g G(Q)\,dW_\tau \tag{6}$$

Here, $Q \equiv (X, P)^T$ is a complex vector variable having 2N elements (X and P each have N elements), and physically corresponds to an amplitude operator represented by normal order of two types of orthogonal phases of each light pulse. $\tau$ is a time normalized with a loss rate of a ring resonator, and $W\tau$ is a real number vector having 2N independent Wiener processes as elements when viewed at the time $\tau$. The vector value function f(Q) is given by the following Formula (7).

[Math. 7]

$$f(Q) = -Q + p\begin{pmatrix} I_N & 0 \\ 0 & -I_N \end{pmatrix}Q - \begin{pmatrix} DIAG(XX^T + PP^T) & 0 \\ 0 & DIAG(XX^T + PP^T) \end{pmatrix}Q + 2\xi\begin{pmatrix} J & 0 \\ 0 & 0 \end{pmatrix}Q \tag{7}$$

Further, G is a matrix and satisfies the following Formula (8).

[Math. 8]

$$G(Q)G^T(Q) = p\begin{pmatrix} I_N & 0 \\ 0 & -I_N \end{pmatrix} - \begin{pmatrix} DIAG(XX^T - PP^T) & 2DIAG(XP^T) \\ 2DIAG(XP^T) & DIAG(PP^T - XX^T) \end{pmatrix} + \frac{\xi^2}{\mu}\begin{pmatrix} JJ^T & 0 \\ 0 & 0 \end{pmatrix} \tag{8}$$

Here, $I_N$ appearing in Formulas (7) and (8) is an identity matrix with N rows and N columns, and DIAG (A) is a diagonal matrix whose diagonal elements match diagonal elements of a matrix A. p is a pump light amplitude normalized such that the oscillation point when there is no coupling is 1, and $\xi$ is the feedback intensity expressed by Formula (4). $\mu$ is a loss rate by measurement normalized by the loss rate of the ring resonator, and takes a value in a range of 0 (sending 0% of all photons to the measurement unit) to 1 (sending 100% of all photons to the measurement unit). Further, $\sigma_g$ corresponds to the reciprocal of the square root of a photon number expectation value in each light pulse in a case where there is no feedback coupling and the pump light amplitude is set to five times the oscillation point ($\xi$=0, p=5).

The time evolution of the above equation is computed on an electronic computer using the Euler-Maruyama method. At this time, G(Q) is computed for each time evolution step from Formula (8) using numerical Takagi decomposition of the matrix (refer to Non Patent Literature 4). In this manner, the complex variable vector Q is time-evolved from the time $\tau$=0 to a measurement time $\tau$=T. Furthermore, this time evolution is repeated a plurality of times (1000 to 20,000 times), and a spin state distribution P($\sigma$) that may be measured by the measurement unit (6, 60, 600) can be computed as represented by Formula (9).

[Math. 9]

$$P(\sigma) = \frac{1}{2^N}E_Q\left[\prod_i\left[1 + \sigma_i \operatorname{erf}\left(\frac{X_i}{\sqrt{2}\,\sigma_m}\right)\right]\right] \tag{9}$$

Here, erf(z) is an error function, and $\sigma_m \equiv \sigma_g/r$ is a real number value determined by the aforementioned $\sigma_g$ and a branching ratio r (0≤r≤1) in a direction of an optical coupler to the measurement unit at the time of distribution measurement. Further, $E_Q[h(Q)]$ represents an operation of averaging the function h(Q) using a plurality of Q values obtained by time evolution computation.

Note that, as the stochastic differential equation, an approximate equation in which a specific term of Formulas (6), (7), and (8) is ignored, an approximate equation modified such that any element of the real part or the imaginary part of the complex vector variable Q is ignored, or an approximate equation obtained by combining them may be used.

Figure 4:
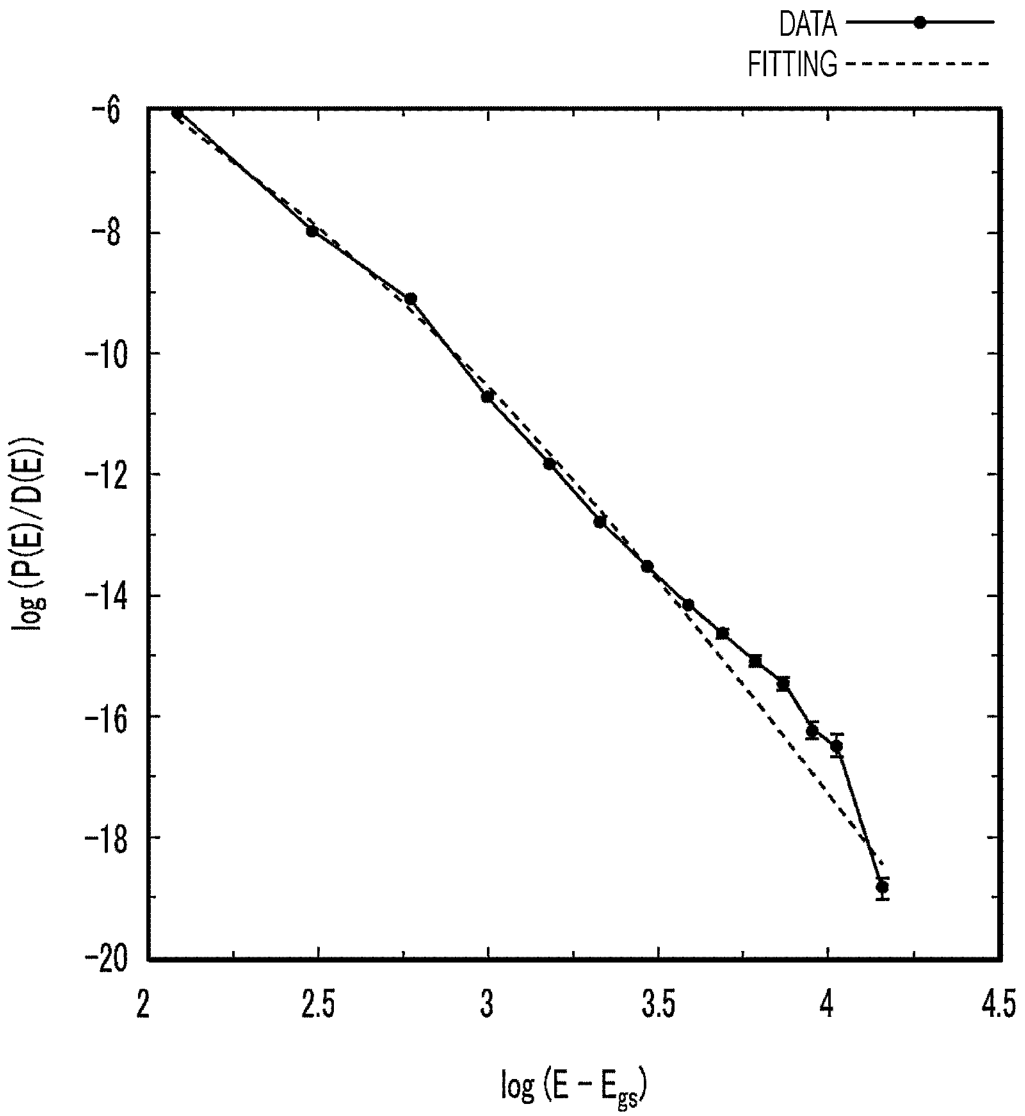
FIG. 4 is a diagram illustrating a distribution output in a case where a coherent Ising machine according to an embodiment of the present invention is simulated on an electronic computer according to still another embodiment of the present invention.

FIG. 4 illustrates a result of simulating, with the above-described method on an electronic computer, the distribution output from the coherent Ising machine on which a square lattice two-dimensional ferromagnetic Ising model is implemented when the amplitude of pump light is fixed to a value equal to the amplitude of the oscillation point. In this simulation, the branching ratio r of the optical coupler at the time of distribution measurement is set to r=1. Here, the horizontal axis represents the energy of a phase state (spin state) of light pulses with a logarithmic value. On the other hand, the vertical axis represents the probability of occurrence of a phase state (spin state) in logarithm in the same manner. Note that, for convenience of numerical computation, the probability on the vertical axis is not P($\sigma$), but is a distribution value obtained by outputting an energy distribution P(E) obtained by taking a probability sum of states having the same energy by the above numerical computation procedure and dividing the energy distribution P(E) by the number of energy states D(E) to be degenerated thereafter. When the distribution of spin states depends only on the energy like the canonical distribution or the Tsallis distribution, P($\sigma$)=P(E($\sigma$))/D(E($\sigma$)) is established. In FIG. 4, the filled circles indicate data of values obtained by the above computation, and the broken line indicates fitting obtained by approximating the data with a Tsallis distribution. As indicated by the broken line, it can be ascertained that the distribution of the obtained data can be approximated by the Tsallis distribution.

The invention claimed is:

1. A computing device for an Ising model, comprising:

a generation unit configured to generate a spin state such that a distribution indicating a probability of existence of the spin state is available to be approximated by a power law distribution as a function of energy of the spin state; and an output unit configured to output the spin state generated by the generation unit.

2. The computing device according to claim 1, wherein the computing device is a computing device for an Ising model in which a phase state of a light pulse by parametric oscillation is caused to correspond to the spin state, and the generation unit is further configured to use a light pulse having an amplitude equal to or less than an oscillation threshold amplitude of light pulses.

3. The computing device according to claim 2, comprising a branching ratio variable optical coupler that is an optical coupler for extracting a part of light pulses from a ring resonator for each circulation of the light pulses and changing a branching ratio between at a time of a normal operation of the computing device and at a time of measurement of the spin state.

4. The computing device according to claim 2, comprising a first measurement unit and a second measurement unit each of which is configured to measure a phase state of a light pulse, the first measurement unit being used for measurement feedback coupling, and the second measurement unit being used for measurement of the spin state.

5. The computing device according to claim 2, wherein a diagonal component of a coupling matrix of the Ising model is corrected to fix the oscillation threshold amplitude.

6. An electronic computer for simulating a computing device, the computing device comprising:

a generation unit configured to generate a spin state such that a distribution indicating a probability of existence of the spin state is available to be approximated by a power law distribution as a function of energy of the spin state; and an output unit configured to output the spin state generated by the generation unit, wherein the computing device is a computing device for an Ising model in which a phase state of a light pulse by parametric oscillation is caused to correspond to the spin state, and the generation unit is further configured to use a light pulse having an amplitude equal to or less than an oscillation threshold amplitude of light pulses.

* * * * *